Jan. 2, 1934.        A. GUDMUNDSEN        1,941,983
                     METALLURGY OF IRON
                     Filed March 21, 1932
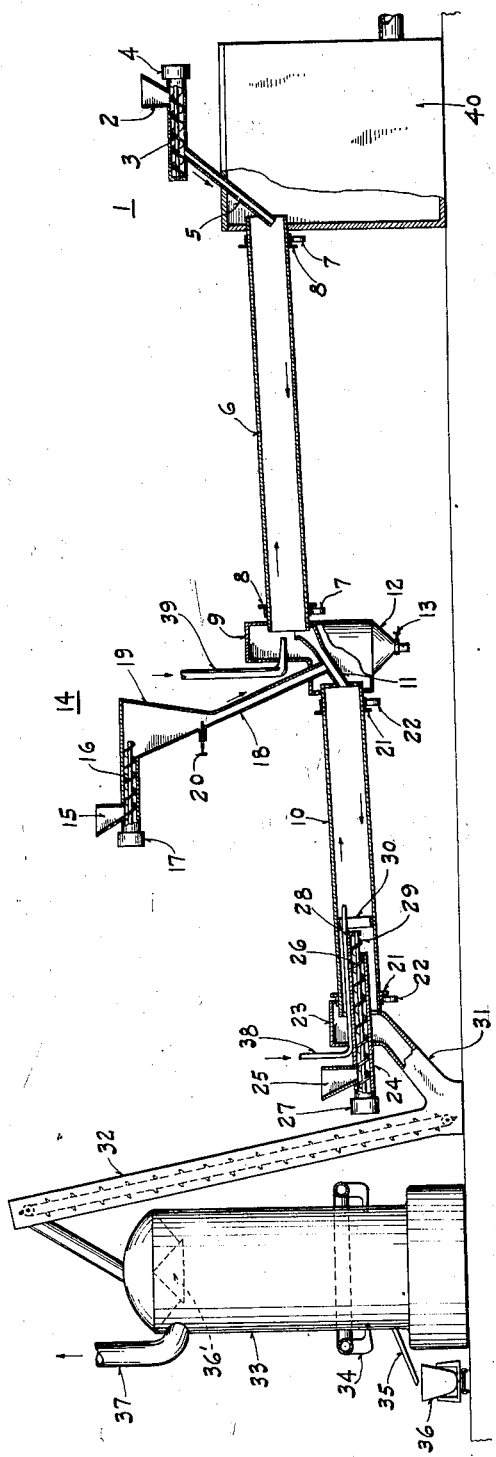
INVENTOR.
Austin Gudmundsen
BY
      ATTORNEY.

Patented Jan. 2, 1934

1,941,983

UNITED STATES PATENT OFFICE

1,941,983

METALLURGY OF IRON

Austin Gudmundsen, Wauwatosa, Wis., assignor to A. O. Smith Corporation, Milwaukee, Wis., a corporation of New York Application March 21, 1932. Serial No. 600,089

13 Claims. (Cl. 75—17)

This invention relates to the manufacture of iron. It has for an object the reduction and carburization of iron ore.

Another object of the invention is to provide a new and commercially feasible process and apparatus for manufacturing iron by reduction of the ore with coal.

A further object is to provide a new method of introducing coal into hot ore in order to effect a coking of the coal and an increased partial reduction of the ore.

Other objects of the invention will appear in the following description and the accompanying drawing.

According to the present invention, iron ore is preheated to a temperature which is below its sintering temperature, and bituminous coal is mixed with the preheated ore in order to effect a rapid destructive distillation of the coal and produce a resultant non-pasty mixture of partially reduced ore and non-volatile carbonaceous matter.

Additional ore is added to the mixture to lower its temperature. The cooled mixture is blasted with air to complete the reduction and to melt the iron. Hot gases are passed countercurrent to the course of the ore for the purpose of heating and assisting in the reduction of the ore.

The following specific embodiment is an illustration of one mode of carrying out the invention, but it is to be understood that the invention is not limited thereto and that modifications may be made without departing from the invention.

Accordingly, iron ore and a suitable flux, such as limestone are each reduced to sizes which include pieces up to about two inches in diameter. Approximately one-half of the total ore charge that is to be reduced and smelted in the process is mixed with a sufficient amount of the limestone to flux all of the ore; for example, the iron oxide and limestone are mixed in the ratio of about 0.9 of a pound of ore to each 0.3 of a pound of the limestone. The mixture is gradually fed into a preheater and heated to about 850° C. to 1000° C. The limestone is decomposed by the heat to lime and carbon dioxide, the latter of which passes off as waste gas. To the preheated charge, is added sufficient bituminous coal to meet the requirements for reducing, melting and carburizing the entire charge of ore; for example, about 1.0 pound of bituminous coal is added for each 0.9 of a pound of ore initially introduced into the preheater. The coal is introduced into the mixture of preheated ore and lime in batches at regular intervals as the ore leaves the preheater. The hot ore and coal are introduced into an internally gas-fired, revolving, inclined kiln which serves as a coker and mixer. The highest temperature of the charge is maintained at or above the temperature at which the bituminous coal quickly cokes without balling the charge and below the sintering temperature of the ore. The temperature employed should preferably be maintained at about 850° C. to 1000° C.

The soft coal coming in contact with the highly heated ore and lime undergoes rapid destructive distillation yielding coke and volatile matter. The coke may comprise the material known commercially as coke or simply a carbonaceous material consisting mainly of uncombined non-volatile carbon. The volatile matter is composed chiefly of hydrogen and carbonaceous gases, such as hydrocarbons which permeate the entire charge and effect a partial reduction of the ore.

The particular manner of feeding the coal into the preheated charge of ore and lime results in an advantageous distribution of these materials in the charge. The charge consists of portions comprising preheated ore and lime regularly interspersed with portions comprising a mixture of bituminous coal, preheated ore and lime. As the volatile matter of the coal is liberated by the heat, it not only permeates its immediate portion of the charge but also the adjacent portions containing only the preheated ore and lime. As a result, the ore which was initially introduced into the preheater is considerably reduced. By introducing the bituminous coal continuously into the stream of preheated ore and lime, thus causing the coal to be evenly distributed throughout the charge as it enters the coker, the ore will be reduced in the coker, but to a less extent.

As the coker is rotated, the charge progresses therethrough, the coal becomes thoroughly distilled, and the resultant coke becomes uniformly mixed with the ore and lime. Some of the volatile matter escapes from the charge and part of it is burned immediately in the coker to heat the charge therein and the balance is allowed to escape into the preheater where it is burned to directly assist in the preheating.

The remainder of the charge of iron ore in an unheated condition is added to and thoroughly mixed with the hot coke, partially reduced iron ore and lime. The temperature of the resultant complete charge is intermediate that of the unheated ore and that of the hot mixture of lime, coke and partially reduced ore, say about 500° C. to 600° C. The percentage of reduction of the ore in the resulting mixture or completed charge is reduced by the addition of the remaining half of the ore.

The complete charge at this stage of the process comprises a fuel in the form of coke, a flux in the form of lime, and an ore which is partially reduced. These constituents are thoroughly intermingled with each other and are at a temperature of about 500° C. to 600° C. This preheated charge is fed into a shaft furnace and smelted with a blast of hot air which is directed into the bottom of the charge. Sufficient coke is present in the charge to finish the reduction of the ore, to carburize the reduced ore, and to supply sufficient heat from combustion to effect the reduction, carburization, and a final melting of the charge.

The shaft furnace which is employed to carry out the present invention is of a hybrid construction in that it partakes of the nature of both the blast furnace and the cupola. It is smaller than the usual blast furnace and larger than the usual cupola furnace for the same capacity as measured by the rate of out-put of molten metal. Its length is less in proportion to its diameter than that of the blast furnace since a smaller proportion of the length of the shaft is employed as a preheating section due to the fact that the charge itself is preheated before its introduction into the furnace. Due also to the fact that the charge is partially reduced before its introduction into the furnace, a smaller proportion of the length of the shaft is necessary as a reduction zone. In relation to the cupola furnace, the furnace of the present invention is longer in proportion to its width because in the latter furnace, there is a section which is used as a reduction zone which section has no counter-part in the cupola. For convenience, the furnace of the present invention will be referred to herein as a short blast furnace.

The off-gases from the short blast furnace may desirably contain CO and $CO_2$ in the ratio of about 2 to 1 by volume which is substantially the same ratio of CO to $CO_2$ in the off-gases of the standard blast furnace, but more or less carbon monoxide can be present in the off-gas depending upon the temperature of the upper layers of charge in the short blast furnace. This can be nicely governed by regulating the temperature of the charge and the height of the short blast furnace.

The proportion of the ore that is initially introduced and preheated may vary. The amount should be such that the charge (comprising the flux and the ore) will have the capacity when heated to predetermined coking temperatures to quickly coke the bituminous coal without balling the charge; and it may desirably be such that the temperature of the complete or final charge, after the introduction and mixing of the balance of the ore, shall be below temperatures which will produce an excessive amount of carbon monoxide in the off-gas from the short blast furnace due to the action of the hot carbon or coke on the escaping carbon dioxide. When large amounts of carbon dioxide are desired in the off-gas, the temperature of the final charge as it enters the furnace should also be below the temperatures that the ore will be reduced by carbon and/or carbon monoxide so that considerable preheating of the charge will be required in the furnace and the off-gases will not carry an undue quantity of sensible heat. For this purpose, the temperature of the final charge should preferably not exceed 700° C. to 750° C.

In determining the proportion of ore that is to be introduced initially, the composition of the coal should be given consideration because necessary to quickly coke the coal and hence upon the amount of heat that must be available from the preheated charge. If the volatile content of the coal is high, the amount of heat necessary to distil the coal will be greater than when the volatile content is not so high and, consequently, a larger proportion of the ore should be preheated in order to supply the necessary heat. When 40% to 60% of the ore is added initially and preheated before the introduction of the coal, satisfactory coking and final temperatures of the charge previous to its introduction into the short blast furnace are obtained. Other amounts may be used depending upon the composition and amount of the coal employed and upon the temperatures desired within the permissible temperature ranges.

When the amount of the coal that is needed to reduce the ore and the composition of the ore are known, the apportionment of the ore which is added to the mixture of ore and coke provides a convenient means of varying the temperature of the charge that is to be delivered to the short blast furnace, the composition of the off-gas, and the temperature of the off-gas. In this manner, it is possible to avoid excessive losses of reducing gases and of sensible heat in the off-gases. It is evident from the foregoing, that the temperature and quality of the off-gas from the short blast furnace can be varied and that the amount of heating and reduction can be variously shifted from one part of the system to another with a corresponding economy in the operation of the system.

The temperature of the ore should always be below the temperatures which appreciably sinter the ore so as to preserve the porosity and mobility of the charge, and it should be high enough to effect a rapid and complete coking of the coal and a substantial preheating of the charge which enters the blast furnace.

The flux may be limestone or lime and may be introduced at any stage of the process up to and including the introduction of the charge into the blast furnace. Limestone is preferably employed because of its low cost, but lime or other fluxes can be used. Limestone is preferably introduced with the ore into the preheating chamber so that it can be reduced to lime before it reaches the coking chamber or blast furnace, thereby avoiding the burden of producing and disposing of a considerable volume of carbon dioxide. By burning the lime in the preheating zone dilution of the combustible gases with carbon dioxide is avoided, thereby effecting economies in the handling of these gases.

Various kinds of bituminous coal give satisfactory results. The coal should contain an appreciable amount of available volatile matter since the volatile matter effects a substantial reduction of the preheated ore. More partial reduction by the volatile matter requires less work in the blast furnace, and hence, expedites the final reduction and melting of the ore. It is not essential that the coal shall produce a coke that has the strength, hardness and lump size of commercial coke since the weight of the upper portion of the furnace charge is much less than in standard blast furnaces and the height of the charge is less. Hence, the draft can be maintained with smaller sizes of particles in the furnace burden. It is evident, therefore, that the coal does not have to be of a variety which produces the strongest coke. The amount of coal to be used is that which will reduce the ore, carburize the iron, and provide enough heat from combustion to effect the reduction and carburization and a final melting of the charge.

The coal may be fed continuously into the stream of preheated ore, but it is desirable to increase the partial reduction of the ore before it is charged into the short blast furnace by adding the coal in batches. The described method of introducing the ore in batches in the coking chamber accomplishes the object of providing a mass of heated ore next to a mixture of ore and coal. This provides a method of percolating reducing gases through ore which is heated to reducing temperatures.

The nature of the flames which effect the heating in the preheating and coking kilns and the charges therein may vary from oxidizing to reducing. The chief purpose of the flame is to heat the contents of the kilns to a predetermined temperature. In the preheating kiln, the material of the charge is oxidized. An oxidizing flame therein will not detrimentally affect the charge but a neutral or reducing flame is not detrimental. In the coking kiln, the charge contains coke and partially reduced ore. The most highly oxidizing flames in the coking kiln would detrimentally affect the charge, but since the coal in the charge yields reducing gases, the charge is shielded by the escaping gases and contact with an oxidizing flame is prevented. A neutral or a reducing flame does not affect the charge detrimentally. In practice, a reducing flame is generally present in the coking kiln and an oxidizing flame in the preheater.

The single figure of the drawing is a partially sectional and partially side elevational view of apparatus for carrying out the process.

In the drawing, the numeral 1 refers to an ore feeding device which comprises a hopper 2, a screw-conveyor 3, a belt-wheel 4 secured to the screw-conveyor 3, and a chute 5 for conducting the mixture of ore and limestone into the upper end of an inclined rotatable preheating kiln 6. The kiln 6 is turned on a plurality of idler rollers 7. The flanged rings 8 which surround and are attached to the kiln 6 are arranged to roll on the idler rollers.

The lower end of the kiln 6 extends through a sidewall into the upper portion of a header 9 which constitutes a dust collector. The upper end of a second inclined rotary kiln 10 extends through the lower opposite side wall of the header 9. A chute 11 which is secured in the header 9 is disposed to conduct the mixture of preheated ore and lime from the lower end of the kiln 6 into the upper end of the coking kiln 10. The header 9 is preferably provided with substantially gas-tight connections with the ends of the kilns 6 and 10. The lower part of the header 9 is provided with a conically shaped dust collector 12 and a slide valve 13 at the bottom is used to remove the dust from the collector.

A coal delivery device 14 is used to introduce coal into the chute 11. The device 14 comprises a hopper 15, a screw-conveyor 16, a pulley 17 secured to the conveyor 16, and a chute 18 which extends downwardly into the header 9 and the chute 11. The upper end of the chute 18 is enlarged to form a hopper 19 for temporarily storing coal. At the lower end of the hopper 19, a slide valve 20 is provided for closing communication between the hopper 19 and the lower portion of the chute 18 so that a quantity of coal can be retained above the slide and charged into the chute 11 in batches.

The second inclined rotary kiln 10 is encircled by a plurality of flanged rings 21 which are secured thereto. Idler rolls 22 are positioned for rotatably supporting the kiln on the rings. The lower end of kiln 10 extends through a substantially gas tight joint into a discharge header 23. A second ore-feeding conveyor tube 24 extends through the header 23 and projects longitudinally into the lower end of the kiln 10. The feeding device comprises a hopper 25 which opens into the tube 24, a screw-conveyor 26 in the conveyor tube, and a pulley 27 secured to one end of the screw-conveyor 26 to turn it. The inner end 28 of the screw-conveyor tube 24 is provided with an opening 29 in its lower side through which the ore is discharged into kiln 10. At or near the end 28 of the conveyor 24 a flange or ring-like member 30 is mounted internally in the kiln 10. The ring serves as a dam to maintain a thicker bed of ore in the coking and reducing zone so as to prolong the heating time. The internal diameter of the flange is appreciably greater than the outside diameter of the screw-conveyor tube so that ore and coke can pass through the space between the flange and the conveyor. In the larger kilns, the ore beds are thicker and the internal flange may be proportioned accordingly or it may be omitted. An ore bed about sixteen inches thick gives good results, but it may be thicker or thinner.

Each of the kilns 6 and 10 are provided with conventional means comprising a ring gear and pinion, not shown, for rotating them.

The lower end of the header 23 is extended to form a delivery chute 31 to convey ore and coke from the kiln 10 to an elevator 32. The elevator 32 conveys the coke and ore to the top of a short blast furnace 33. The blast furnace is provided with tuyères 34, spout 35 which leads from the tap hole for conducting molten metal into a portable ladle 36, charging bell 36', and an off-gas flue 37 of well known construction.

In order to produce the required heat for the preheating of the ore and the coking of the coal, burners are positioned at the lower end of each kiln and directed into the kilns. Thus a burner 38, where air and combustible gas may be introduced, is inserted through the header 23 into the lower end of kiln 10. The burner extends slightly beyond the end 28 of the screw-conveyor 24 so as to deliver its products of combustion to the upper portion of the kiln 10. Another burner 39 is inserted through the header 9 and directed into the lower end of kiln 6. Substantially no gas except air is commonly passed through this burner since the distillation of the coal in kiln 10 commonly provides sufficient combustible gas for the kiln 6.

The upper end of kiln 6 extends into a chamber 40 which may contain heat absorbing elements, such as a steam boiler or hot water tubes, or the chamber may lead to a draft stack.

The pulleys 4, 17 and 27 on the feeding devices 1, 15 and 24 may be individually driven by separate motors, or they may be collectively driven from a common drive shaft. A common drive for all the pulleys will provide for a constant rate of feed. Individual drives give more flexibility in the control.

The mode of operation of the described apparatus is briefly as follows.

Crushed ore and limestone are fed continuously by feeding device 1 into the kiln 6 through which they progress as the kiln is rotated. In this kiln, the charge is preheated by introducing air through burner 39 to burn the combustible gases which enter kiln 6 from kiln 10. The hot gases from kiln 10 also assist in preheating the charge. As the preheated charge is discharged into kiln 10, the coal is fed into the ore stream in batches by intermittently opening the valve 20 in hopper 19. The charge passes along kiln 10 due to the inclination and rotation of the kiln and the coal is quickly coked and yields reducing gases which partially reduce the ore. As the charge passes the ring 30, additional ore is continuously added thereto by the feeding device 24 and the charge is cooled. The lower end of kiln 10 serves as a mixing and cooling chamber for the charge. The charge is carried by the conveyor 32 into the top of the furnace 33 in which the charge is fired by blasts of air from tuyères 34. At intervals the molten iron is tapped from the furnace through spout 35 into ladle 36.

Various modifications and structural re-arrangements of the described apparatus may be made for carrying out the described process. The kilns may be arranged so that one is disposed directly above the other. Kiln 10 may be replaced by two drums one of which serves as a coker and the other as a mixer. The elevator may be dispensed with by positioning the furnace below the discharge end of kiln 10. The off-gas from the furnace 33 may be employed as the fuel for heating both the coking and preheating kilns, if the volatile matter from the soft coal should prove insufficient for heating purposes.

The invention provides for utilizing soft coal and limestone as the reducing, fueling and fluxing agents in the manufacture of iron, while having all the advantages of coke and lime and a preheated charge in the smelting operation, and also for controlling the latent and sensible heat content of the off-gases from a blast furnace.

I claim:

1. A method of reducing iron ore which comprises preheating a mixture of ore and flux to temperatures below the sintering temperature of the ore, adding soft coal to the heated mixture, heating the mixture to elevate its temperature nearly to the sintering temperature of the ore, adding unheated ore in an amount substantially equal to the amount of ore in the initial mixture, mixing the heated and unheated ores, and smelting the resultant mixture.

2. A method of reducing iron ore which comprises preheating a mixture of ore and flux to about 850° C. to 1000° C., adding soft coal to the heated mixture, heating the mixture to about 850° C. to 1000° C., adding another portion of ore equal to that initially used, mixing the resulting charge, and smelting said resulting charge by a blast of air.

3. A method of reducing iron oxide which comprises mixing substantially one-half of the oxide charge with sufficient limestone to flux the impurities contained in the entire charge of oxide, heating the mixture to about 850° C. to 1000° C., adding bituminous coal in an amount sufficient to smelt all the ore, heating the mixture to maintain said temperatures, mixing the other half of the ore with the heated ore, and smelting the resultant mixture.

4. A method of reducing metallic oxides which comprises heating approximately one-half of the oxides to temperatures which will rapidly coke bituminous coal and below the sintering temperature of the oxide, adding sufficient soft coal to the heated oxide for smelting all the oxide, mixing the coal and oxide, heating the mixture of coal and oxide to maintain it at the above defined temperature, adding the remainder of the oxide to the heated mixture, mixing the resultant batch, and smelting the mixed batch.

5. A method of making a mixture of coked carbonaceous material and partially reduced iron ore which comprises heating the ore to temperatures below its sintering temperature and to temperatures sufficient to rapidly coke soft coal without balling, adding soft coal in batches to the heated ore to produce portions of mixed coal and ore separated by portions of heated ore, heating the mixture of ore and coal to maintain about the above defined temperatures, and adding fluxing material to cool the mixture.

6. In the method of reducing iron ore, the steps of coking carbonaceous material and partially reducing the ore which comprise heating the ore to approximately 850° C. to 1000° C., adding soft coal in batches to the heated ore to produce portions of mixed coal and ore separated by portions of heated ore, mixing the ore and coal, heating the mixture to about 850° C. to 1000° C., and adding fluxing material to cool the mixture.

7. In the method of reducing iron ore, the steps of coking and partially reducing the ore which comprise heating substantially one-half thereof to a temperature of about 850° C. to 1000° C., adding bituminous coal to the heated ore and mixing them with each other, heating the mixture formed thereby to about the above stated temperature, and cooling the mixture by adding the remainder of the ore.

8. The method of manufacturing iron which comprises mixing a portion of a total charge of iron ore that is to be reduced with sufficient limestone to flux the entire charge of ore, heating the mixture to temperatures which are below the sintering temperature of the ore and at least as high as the temperature which rapidly decomposes bituminous coal, adding sufficient bituminous coal to the mixture to smelt the entire charge of ore and flux, adding the remainder of the ore to and mixing it with the heated mixture, and smelting the charge.

9. The method of manufacturing iron which comprises continuously preheating a mixture of iron ore and fluxing material to the coking temperatures of bituminous coal and below the sintering temperature of the ore, adding bituminous coal in excess of that which is sufficient to reduce the ore, mixing the coal and preheated material to provide a mixture of coke and partially reduced ore, forming a cooled charge by adding ore to said coke and ore mixture, and blasting the charge with air to support combustion of said excess of carbon for completing the reduction of the ore and to melt the reduced material.

10. The method of manufacturing iron which comprises continuously preheating a mixture of iron ore and fluxing material to temperatures of about 850° C. to 1000° C., adding bituminous coal in excess of that which is sufficient to reduce the ore, mixing the coal and preheated material to provide a mixture to coke and partially reduced ore, forming a cooled charge by adding ore to said coke and ore mixture to reduce the temperature thereof to about 500° C. to 600° C., and blasting the charge with air to support combustion of said excess of carbon for completing the reduction of the ore and to melt the reduced material.

11. In the reduction of iron ore, the steps for producing a charging mixture for a short blast furnace which contains partially reduced iron ore, coke and flux which comprises heating ore to temperatures sufficient to rapidly coke soft coal without balling but below sintering temperatures of the ore, continuously mixing soft coal with the heated ore in a restricted zone, heating the mixture to maintain about the above defined temperature to partially reduce the ore and continue the distillation of the coal, and adding ore and fluxing material to the mixture to cool the same.

12. In the reduction of iron ore, the steps for producing a charging mixture for a short blast furnace which contains partially reduced iron ore, coke and flux which comprises heating the ore to temperatures sufficient to rapidly coke soft coal without balling but below sintering temperatures of the ore, continuously mixing soft coal with the heated ore in a restricted zone, heating the mixture by the combustion of gases derived from distillation to maintain about the above defined temperature to partially reduce the ore and continue the distillation of the coal, passing the combustion gases over the ore to heat the same, and adding ore and fluxing material to the mixture to cool the coke containing mixture.

13. The method of reducing iron ore which comprises making a charging mixture containing partiallly reduced ore, flux and an excess of coke over that which is required for reducing the ore by heating the ore to temperatures sufficient to rapidly coke soft coal without balling but below sintering temperatures of the ore, continuously mixing soft coal with the ore within a restricted zone, maintaining said temperature a period sufficient to continue the partial reduction of the ore and the distillation of the coal, adding the remainder of said constituents of the charge to cool the same, and completing the reduction and melting the reduced material in a separate reducing furnace by charging the cooled charging mixture therein, said reduction and melting being effected by the action of said carbonaceous material, the heat produced by the combustion of said excess carbon and an oxygen-containing blast.

AUSTIN GUDMUNDSEN.